United States Patent
Yates et al.

(10) Patent No.: US 7,845,313 B1
(45) Date of Patent: Dec. 7, 2010

(54) DEVICE FOR STORING AND PROTECTING PET MEDICAL DATA, PARTICULARLY SUITED FOR BEING CARRIED BY A PET

(76) Inventors: Corey D. Yates, 160 Pinewood Dr., Holly Springs, MS (US) 38635; Keith P. Melancon, 217 Dover Trace, Hattiesburg, MS (US) 39401

( * ) Notice: Subject to any disclaimer, the term of this patent is extended or adjusted under 35 U.S.C. 154(b) by 201 days.

(21) Appl. No.: 12/149,986

(22) Filed: May 12, 2008

(51) Int. Cl.
*A62B 35/00* (2006.01)
(52) U.S. Cl. ...................................... 119/859
(58) Field of Classification Search ................ 119/712, 119/850, 856–859, 174
See application file for complete search history.

(56) References Cited

U.S. PATENT DOCUMENTS

| | | | | |
|---|---|---|---|---|
| 5,355,839 A | * | 10/1994 | Mistry | 119/858 |
| 5,515,033 A | * | 5/1996 | Matarazzo | 340/573.3 |
| 5,857,433 A | * | 1/1999 | Files | 119/720 |
| 6,043,748 A | * | 3/2000 | Touchton et al. | 340/573.3 |
| 6,236,358 B1 | * | 5/2001 | Durst et al. | 342/357.09 |
| 6,329,918 B1 | * | 12/2001 | Moyer | 340/573.1 |
| 6,568,354 B1 | * | 5/2003 | Wasserman et al. | 119/859 |
| 7,515,053 B2 | * | 4/2009 | Klein | 340/572.8 |
| 7,533,482 B2 | * | 5/2009 | Huenefeld | 40/301 |

* cited by examiner

*Primary Examiner*—Thomas Price
(74) *Attorney, Agent, or Firm*—Shlesinger, Arkwright & Garvey LLP

(57) ABSTRACT

Device for storing and protecting data for domestic animals includes housing configured for and sufficiently strong for being worn by an animal in an outside environment. There may be an attachment device, such as a collar, configured for attaching housing to an external portion of the animal, in use. There may likewise be provided an electronic data storage device within the housing. The electronic data storage device may include software written for storing animal medical and ownership identification data, veterinarian, and medical records, and which records relate to the animal wearing the device. The housing may be sufficiently water-proof for being continually worn outdoors by the animal. The identification device may include a type-A USB connection so that the information stored on the data storage device may be easily accessed and read by a large portion of the population, without the a specialized data reading device.

7 Claims, 1 Drawing Sheet

DEVICE FOR STORING AND PROTECTING PET MEDICAL DATA, PARTICULARLY SUITED FOR BEING CARRIED BY A PET

FIELD OF THE INVENTION

The invention relates to data storage devices. More particularly, the invention relates to information storage devices for containing medical records and identifying information. Even more particularly, the invention relates to medical information and identification information storage devices configured for storing domestic animal data, and for being attached to and carried by the animal so that the information is readily available.

BACKGROUND OF THE INVENTION

Data storage devices are known.

For example, there are metal identification (ID) bracelets, such as so-called "medical alert" bracelets worn by humans. Metal tags are likewise known on which a pet's name and the owner's name and telephone number are provided.

Further, electronic identification tags for domestic animals, such as cats and dogs are known.

Typical animal identification chips are integrated circuit (IC) devices or RFID (radio frequency identification devices) employing passive RFID technology. These known data storage devices are able to store only pet owner identifying information, and are typically in the form of a microchip implanted under the skin of the respective cat or dog. Currently in the United States there are two widespread competing electronic pet ID data standards. Those competing pet ID data standards are incompatible.

The presence of incompatible data storage devices causes problems for pet owners, as veterinarians typically have only one type of equipment configured for reading the owner identification information off such implanted ID chips. Thus, even if a lost dog is found and presented to a veterinarian, if the veterinarian does not own the right type of chip data retrieval equipment, the ID chip data cannot be read, and the identifying chip carried by the lost dog is effectively rendered worthless.

Further, such implanted data ID chips cannot be read by a person who finds a lost pet. Rather, the finder of a lost pet must transport the lost dog, for example, to a veterinarian. Once at the veterinarian's office, the veterinarian must be able to actually read the information revealing the owner's identity, as described above.

Also, the implanted chips may be improperly implanted, and may move over time to a different site on the animal's body, such as when an implanted chip migrates under the skin or becomes dislodged from its original implantation site. Thus, the finder of a pet or a veterinary technician may not be able to readily determine that the found pet has an implanted chip.

Still further, implanted animal ID chips may be rendered useless in the presence of strong electromagnetic fields, such as when the animal implanted with an ID chip is subjected to the magnetic fields generated when being administered a test using an MRI (magnetic resonance imaging) device. Indeed, when an implanted chip is subjected to the magnetic fields in an MRI, the magnetic fields may be sufficiently strong so as to heat up the chip to the point at which the animal's tissue is injured by the resulting heat, thus causing injury to the animal.

Given the multiple steps required for the finder of a lost pet to find the implanted chip, take it to a veterinarian, who may or may not have the compatible pet data chip reader, and thus ultimately restore the lost pet to the rightful owner, there are a great disincentives and technological roadblocks for the finder of such a lost pet to locate the true owner.

Thus, as can be seen, there is a need for an improved data storage information device for domestic animals that does not have the drawbacks set forth above.

OBJECTS AND SUMMARY OF THE INVENTION

It is an object of the invention to overcome the drawbacks of the prior art data storage devices, including but not limited to the expense of implanted ID devices, the danger of implanted ID devices, such as RFID chips, the risk of damage to the implanted RFID devices and harm to the animal in which the RFID device is implanted, such as when exposed to electromagnetic radiation during procedures in an MRI.

It is a further object of the invention to provide a domestic animal identification and medical storage device.

It is another object of the invention to provide a domestic animal identification and medical storage device which is carried by the animal on the outside of the animal, so that it is readily visible to a finder of a lost animal, an MRI technician, and a veterinarian, for example, so as to avoid the problems associated with implanted ID devices.

It is a further object of the invention to provide a pet medical and owner identification storage device which is configured for providing non-veterinarians with access to the stored data.

It is a further object of the invention to provide a device which can be readily uploaded and downloaded for updating information to be stored, as well as for accessing such stored data.

It is a further object of the invention to provide a device which is compatible with standard data access ports, such as available on a conventional computer, e.g., a personal computer.

The invention includes a device for storing and protecting data for domestic animals that includes a housing configured for and sufficiently strong for being worn by an animal in an outside environment. There may be an attachment device configured for attaching a housing to an external portion of a domestic animal, in use. There may likewise be provided an electronic data storage device within the housing. The electronic data storage device may further include software written and particularly suited for storing animal medical and ownership identification data, as well as veterinarian data, and any and all medical records as needed, and which records relate to a particular animal which is wearing the device.

Still further, the housing for the device may be made sufficiently waterproof so that it may be worn continually in an outside environment.

Even further, the inventive device may include a universal data port for being connected to a mating data port of a conventional computer, such as a personal computer (PC). The data port may be type-A USB connection so that the electronic data (i.e., information) stored on the data storage device may be easily accessed by a large portion of the population. That is, the data may be easily accessed without the need to consult a veterinarian owning a reader for accessing the data, thus avoiding the need to make a trip to the veterinarian in order to upload new information or to download existing information provided on the storage device.

Relative terms such as up, down, left, and right are for convenience only and are not intended to be limiting.

DETAILED DESCRIPTION OF THE INVENTION

Figure 1:
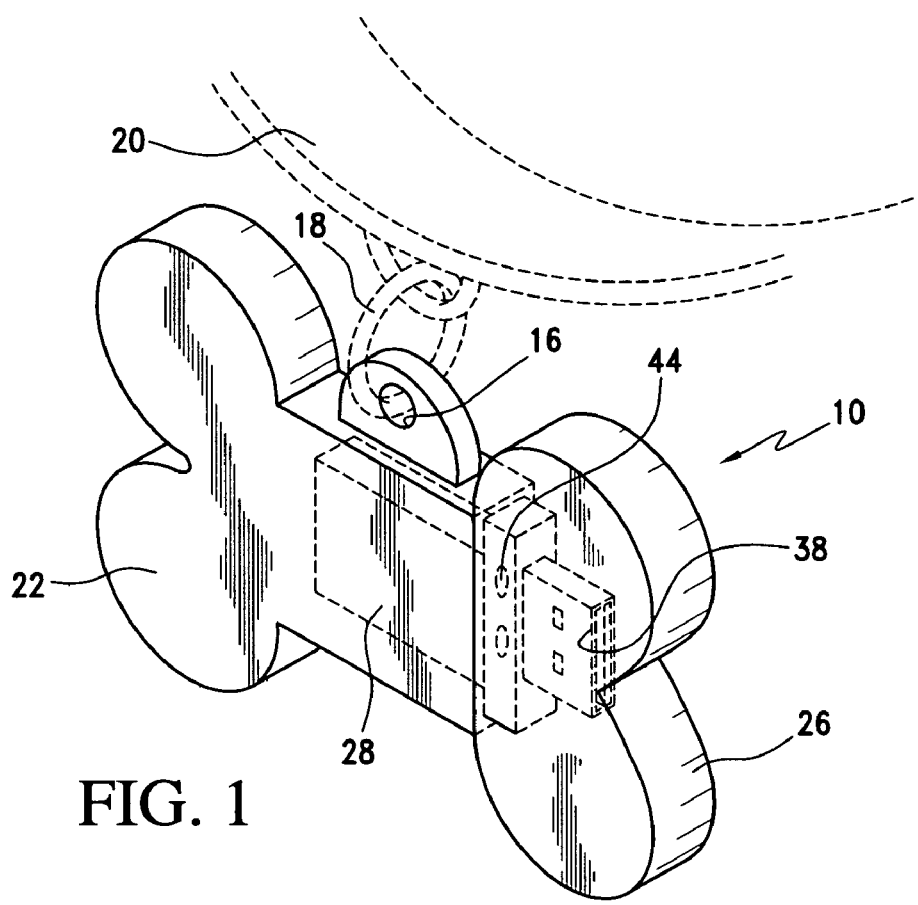
FIG. 1 is a perspective view of an embodiment of an electronic medical data and ownership data storage device particularly suited for use by domestic animals, such as cats and dogs, shown in use attached to a collar of a pet.
Figure 2:
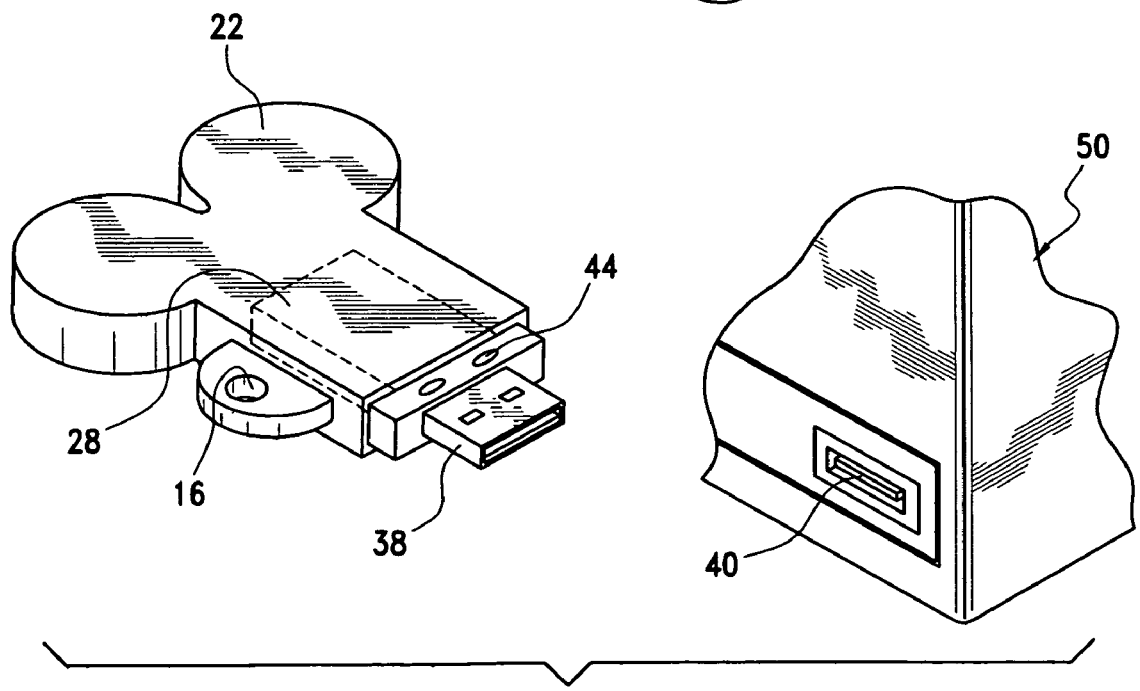
FIG. 2 is a further perspective view of the embodiment of FIG. 1, shown with a protective cap removed, and the manner in which the inventive data storage device may be connected to a personal computer for uploading and downloading information stored on the storage device.

FIGS. 1 and 2 show perspective views of an animal data storage device 10 according to the invention.

Data storage device 10 may include a housing having a connection element 16, such as a hole, provided on it. In use, connection element 16 may be connected to a pet collar 20 by use of a further attachment 18, such as the illustrated ring 18.

The housing of device 10 may further include a body 22 and a detachable cap 26.

An electronic data storage device 28, such as the illustrated flash drive, may be provided in body 22, for example. As shown, at least a portion of flash drive 28 may be securely embedded in body 22. Cap 26 may be readily removable so that a user may download data by use of a male connector 38, such as the illustrated type-A USB connector.

Electronic data storage device 28 may be secured in body 22 by an adhesive, a friction fit, or by being molded into body 22, such as in a waterproof manner.

Software may be pre-downloaded in electronic data storage device 28 so that the user may readily use the it, and it may be pre-loaded with software compatible with various conventional computer software systems, as will be readily understood to a person having ordinary skill in the art.

As may be readily appreciated, the male USB connector 38 is configured for being inserted into a USB hub or USB port, such as a female USB connector, as shown by the illustrated built-in USB host controller 40 of the type which is provided on a large number of currently produced computers, such as the illustrated computer 50 of FIG. 2.

Still further, in order to protect data storage device 28, cap 26 will typically be securely and, indeed, water tightly attached to body 22. The secure, detachable attachment may be accomplished by use of mating male and female connector elements 44, such as corresponding mating protrusions and recesses (e.g. male and female connector elements) molded or otherwise provided in respective portions of body 22 and cap 26.

One or both of body 22 and cap 26 may be made of a sufficiently hard material so that flash drive 28 is not damaged during use by the animal. For example, body 22 and cap 26 may be made of a sufficiently hard plastic so that it is not damaged, and also body 22 and cap 26 may include a sufficiently resilient mating portion so that a watertight fit may be achieved.

It is further contemplated that device 10 may be configured for use by other domestic animals, such as cows, horses, and any other animals for which data relating to medical and ownership identification may be desirably provided directly on the animal at all times.

The inventive device 10 as been successfully made as a waterproof housing surrounding a high-speed micro USB device nestled inside a rugged housing and including software holding all of a pet's vital information that can be accessed by one, or more than one, conventional software system, such as by being accessed on any current Windows®-based or Mac®-based computer software systems. (Windows® is a registered trademark of Microsoft Corporation, Redmond, Wash., 98052 USA (see www.microsoft.com) and Mac® is a registered trademark of Apple Computer, Inc., Cupertino, Calif., 95014 USA (See www.apple.com).

The device may store the user's (i.e., the owner's) contact information, the pet's health records, photos, X-rays, other documents, and veterinarian contact information.

More specifically, the software may include information, such as owner information, medical records, photos, x-rays, documents, and other basic information including, but not limited to: pet name, picture of the animal, birth data, microchip number, gender, tattoo number, neutering status, AKC (American Kennel Club, Inc., New York, N.Y.) number, breed, UKC (United Kennel Club, Inc., Kalamazoo, Mich.) number, color/markings, sire's name, dam's name, sire's registration number, and dam's registration number.

Further, there may be owner information, such as: primary owner, secondary contact, first, middle, last name, owner's address, city, zip code, state, country, picture of owner, contact information: work telephone number, home telephone number, and cell phone number.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

What is claimed is:

1. An animal identification and medical information storage device for storing and protecting data for a domestic animal that is configured to be worn by the animal completely externally of the animal's body, the device comprising:
   a) a housing configured for and sufficiently strong for being worn by an animal, the housing being configured for being worn completely externally of the animal's body, and the housing being configured for being worn by the animal in an outside environment;
   b) an attachment device configured for attaching the housing to an external portion of a domestic animal, in use, and the attachment device being attached to the housing;
   c) an electronic data storage device provided within the housing, the electronic data storage device being configured for storing and protecting data for a domestic animal; and
   d) a universal data port physically attached to and operatively connected to the electronic data storage device, the universal data port being configured for physically attaching to and downloading data from the electronic data storage device to a mating data port of a computer;
   e) the universal data port being a type-A USB connector configured for being inserted into a mating data port of a computer; and
   f) a waterproof cap being provided, the waterproof cap being detachably attached to the housing and including a sufficiently resilient mating portion configured for achieving a watertight fit and protecting the type-A USB connector.

2. An animal identification and medical information storage device as in claim 1, wherein:
   a) software is provided on the electronic data storage device, the software is written and particularly suited for storing animal identification and medical information data, including ownership identification data, and veterinarian data.

3. An animal identification and medical information storage device as in claim 2, wherein:
   a) the software is written for being accessed by more than one conventional software system for accessing the animal identification and medical information data, including the ownership identification data, and the veterinarian data.

4. An animal identification and medical information storage device as in claim 1, wherein:
   a) the housing for the device is sufficiently water-proof so that it may be worn continually in an outside environment.

5. An animal identification and medical information storage device as in claim 1, wherein:
   a) software is provided on the electronic data storage device, the software is written for being accessed by more than one conventional software system for accessing the data for a domestic animal.

6. An animal identification and medical information storage device as in claim 1, wherein:
   a) the electronic data storage device is secured in the housing by one of an adhesive, a friction fit, and being molded into the housing in a waterproof manner.

7. An animal identification and medical information storage device for storing and protecting data for a domestic animal that is configured to be worn by the animal completely externally of the animal's body, the device comprising:
   b) a housing configured for and sufficiently strong for being worn by an animal, the housing being configured for being worn completely externally of the animal's body, and the housing being configured for being worn by the animal in an outside environment;
   c) an attachment device configured for attaching the housing to an external portion of a domestic animal, in use, and the attachment device being attached to the housing;
   d) an electronic data storage device provided within the housing, the electronic data storage device being configured for storing and protecting data for a domestic animal; and
   e) a type-A USB connector physically attached to and operatively connected to the electronic data storage device, the type-A USB connector configured for being inserted into a mating data port of a computer;
   f) a waterproof cap being provided, the waterproof cap being detachable attached to the housing and including a sufficiently resilient mating portion configured for achieving a watertight fit and protecting the type-A USB connector;
   g) the housing for the device being sufficiently water-proof so that it may be worn continually in an outside environment; and
   h) software being provided on the electronic data storage device, the software is written for being accessed by more than one conventional software system for accessing the data for a domestic animal.

* * * * *